(12) United States Patent
Verbitsky

(10) Patent No.: US 7,207,032 B1
(45) Date of Patent: Apr. 17, 2007

(54) EXPANDING A SOFTWARE PROGRAM BY INSERTION OF STATEMENTS

(75) Inventor: George Verbitsky, Mountain View, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 683 days.

(21) Appl. No.: 10/402,663

(22) Filed: Mar. 28, 2003

(51) Int. Cl.
*G06F 9/44* (2006.01)
*G06F 9/45* (2006.01)

(52) U.S. Cl. ............... 717/106; 717/114; 717/140; 717/151; 717/144; 717/156

(58) Field of Classification Search .............. None
See application file for complete search history.

(56) References Cited

U.S. PATENT DOCUMENTS

| | | | |
|---|---|---|---|
| 4,571,678 A * | 2/1986 | Chaitin ............. | 717/156 |
| 4,656,582 A * | 4/1987 | Chaitin et al. ....... | 717/153 |
| 4,777,588 A * | 10/1988 | Case et al. .......... | 712/41 |
| 4,782,444 A * | 11/1988 | Munshi et al. ....... | 717/153 |
| 5,249,295 A | 9/1993 | Briggs et al. ........ | 717/157 |
| 5,428,793 A | 6/1995 | Odnert et al. ....... | 395/700 |
| 5,530,866 A | 6/1996 | Koblenz et al. ...... | 717/144 |
| 6,553,426 B2 * | 4/2003 | Holzle et al. ........ | 719/310 |
| 2004/0003385 A1 | 1/2004 | Kushlis ............. | 717/158 |

OTHER PUBLICATIONS

Boquist-Johnson, The GRIN Project: A Highly Optimising Back End for Lazy Functional Languages, 1995, Chalmers University of Technology, Department of Computing Science, Goteborg, Sweden, {boquist, johnson}@cs.chalmers.se.*

Entire File History of U.S. Appl. No. 10/402,736, filed on Mar. 28, 2003 by G. Verbitsky, including all office actions and amendments therein.

Urban Boquist, "Interprocedural Register Allocation for Lazy Functional Languages", Licentiate Degree Dissertation, Computer Science, Chalmers University of Technology, Goteborg, Sweden, Mar. 13, 1995.

P. Briggs, K. D. Cooper, K. Kennedy, and L. Torczon, "Coloring Heuristics for Register Allocation", in Proceedings of the ACM SIGPLAN, Conference on Programming Language Design and Implementation, pp. 275-284, Portland, Oregon, Jul. 1989.

(Continued)

*Primary Examiner*—Antony Nguyen-Ba
(74) *Attorney, Agent, or Firm*—Silicon Valley Patent Group LLP; Omkar Suryadevara

(57) ABSTRACT

Every function that is called ("called function") is expanded by insertion of several statements at the entry and exit thereof. Moreover, a calling function may also be expanded, by insertion of statements prior to and/or subsequent to a statement in which a called function is invoked. Many of the statements that are inserted contain new variables (called "synthetic variables") to which registers are allocated during register allocation; the synthetic variables are not part of the originally-written software but are introduced during expansion, e.g. to transfer arguments to and return value from the called functions. Statements that are inserted can be either statements that are translated into assembly code in the normal manner, or alternatively dummy statements that contain instructions which are never translated into assembly code (i.e. ignored by the assembler). Use of dummy statements ensures that a web is established for new variables. After expansion, register allocation is performed.

14 Claims, 4 Drawing Sheets

OTHER PUBLICATIONS

"Register Allocation", Chapter 16 of the book "Advanced Compiler Design and Implementation" by Steven S. Muchnick, published by Morgan Kaufmann, Academic Press 1997.

P. Briggs, K. Cooper, and L. Torczon, "Coloring Register Pairs," ACM Letters on Programming Languages and Systems, 1(1):3-13, Mar. 1992.

M. D. Smith, and G. Holloway, "Graph-Coloring Register Allocation for Architectures with Irregular Register Resources", Submitted to PLDI, 2002.

Timothy Kong, Kent D. Wilken, "Precise Register Allocation for Irregular Architectures," International Symposium on Microarchitecture, 1998.

Preston Briggs, Keith D.Cooper, Linda Torczon, "Improvements to Graph Coloring Register Allocation", ACM Transactions on Programming Languages and Systems, 1994.

Nickerson, "Graph coloring register allocation for processors with multi-register operands", 1990 (pp. 40-52).

Michael D. Smith & Glenn Holloway, "Graph-Coloring Register Allocation for Irregular Architectures" 2001.

Mogensen, "Register allocation for 8-bit processors?", Mar. 1995 in "comp.compilers" News Group.

Preston Briggs, "Register Allocation via Graph Coloring", PhD Thesis, Rice University, Apr. 1992.

Neighborhood-based Variable Ordering Heuristics for the Constraint Satisfaction Problem by gbessiere et al 2001 (5 pages).

A Faster Optimal Register Allocator, Fu et al. IEEE Jan. 2002, pp. 245-256.

The GRIN Project: A Highly Optimizing Back End for Lazy Functional Languages, Boquist-Johnson, 1995, Chalmers University of Technology, Department of Computing Science, Goteborg, Sweden.

* cited by examiner

EXPANDING A SOFTWARE PROGRAM BY INSERTION OF STATEMENTS

CROSS-REFERENCE TO COMPUTER PROGRAM LISTING APPENDIX

Appendix A contains the following files in one CD-ROM (of which two identical copies are attached hereto), and is a part of the present disclosure and is incorporated by reference herein in its entirety.

```
Volume in drive D is 030326_2117
Volume Serial Number is B800-D531
Directory of D:\
03/26/2003   12:01p            338 ASNDM.TXT
03/26/2003   03:03p        109,475 ASNINST.TXT
03/26/2003   03:03p        310,056 BINAINST.TXT
03/26/2003   12:01p            226 BINASDM.TXT
03/26/2003   12:05p          1,280 CALLINST.TXT
03/26/2003   10:06a        117,873 FUNC.TXT
03/26/2003   10:08a          1,051 FUNCALLD.TXT
03/26/2003   10:07a          2,632 FUNCALLN.TXT
03/26/2003   12:05p          5,939 FUNCARGS.TXT
03/26/2003   03:04p         34,770 INST.TXT
03/26/2003   01:52p         75,390 PARSER.TXT
03/26/2003   10:07a         78,826 STMNT.TXT
03/26/2003   10:10a            415 SUBSTUTE.TXT
             13 File(s)    738,271 bytes
              0 Dir(s)           0 bytes free
```

The files of Appendix A form source code of computer programs for an illustrative embodiment of the present invention.

The file PARSER.TXT contains a definition of the syntax of a high level language and software for a parser for the language. The file STMNT.TXT contains functions which operate on data structures that represent statements in the program being compiled. The file FUNC.TXT contains functions which operate on data structures that represent functions in the program being compiled.

The file FUNCALLD.TXT contains a subroutine extracted from the FUNC.TXT file and illustrates how a called function is expanded in the program being compiled. The file FUNCALLN.TXT contains a subroutine extracted from the FUNC.TXT file and illustrates how a calling function is expanded in the program being compiled. The file SUBSTUTE.TXT contains a subroutine extracted from the FUNC.TXT file and illustrates how a function call statement in a calling function is substituted with a jump statement copied from the function being called.

The files ASNDM.TXT and BINASDM.TXT contain two examples of classes for dummy statements that are used in some embodiments of the invention. These two classes are inherited from classes of non-dummy instructions namely TurboAssgnInstruction and TurboBinAsInstruction which are defined in files ASNINST.TXT, BINAINST.TXT and these two class in turn are inherited from class TurboInstruction defined in file INST.TXT.

The file FUNARG.TXT contains functions which are involved in transferring registers allocated for arguments in a called function to the calling function as described below. The functions in this file use functions from a class Turbo-FCallInstruction which is provided in file CALLINST.TXT.

Note that the TurboFakeInstruction class in file FUNCARGS.TXT is essentially a special dummy instruction which is treated exactly like a dummy instruction (as discussed below) in a sense that it is ignored during code generation phase. This class is used to build webs for argument variables and for a return variable in the called function. A special dummy class is used in this version of the software just to simplify coding, and may disappear in a later version of this software.

The attached software is written in object oriented Perl, version 5.6 and can be interpreted using an interpreter available from www.cpan.org. The attached software can be used with a Sun workstation running the Unix or Solaris operating system. The software can be used for compiling programs written for execution on a network processor, such as nP7510 available from AMCC of San Diego, Calif. The assembler code generated by such compilation can be assembled using an assembler available from AMCC.

COPYRIGHT NOTICE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

BACKGROUND OF THE INVENTION

A thesis by Urban Boquist entitled "Interprocedural Register Allocation for Lazy Functional Languages", published by Department of Computing Science, Chalmers University of Technology on Mar. 13, 1995 is incorporated by reference herein in its entirety. This thesis describes an interprocedural register allocation algorithm, which is an extended variant of Briggs' optimistic graph coloring. Boquist uses interprocedural coalescing to achieve a custom-made calling convention for each function. Moreover, Boquist adds a restricted form of live range splitting in a way that is particularly useful for call intensive languages.

In the above described thesis (see middle of page 10), Boquist mentions two different approaches to interprocedural register allocation:
 program-wide register allocation, done for all variables in the program at once; and
 per-procedure register allocation, using interprocedural (program-wide) information to reduce the call and return overhead.

According to Boquist, a key observation for these approaches is that procedures that cannot be active at the same time can use the same registers for local variables. Therefore, if registers are allocated for one procedure at a time in a bottom-up traversal of the procedure call graph, and avoid using registers used by descendant procedures, then there is no need to save and restore registers around procedure calls.

Boquist also states (see top of page 38) that when generating code for a function call to the function-f, assuming the actual arguments can be found in the virtual registers a1 and a2, generation of the code:
 copy a2→r2
 call f where r1 and r2 are the virtual registers in which f expects its arguments. In the same style, the first thing f will do is:
 copy r1→t1
 copy r2->t2 where t1 and t2 are virtual registers that will be used when f needs its arguments. Boquist describes virtual registers as being registers to which values are initially assumed as being allocated (see top of page 33). Boquist also refers to virtual registers as live ranges.

According to Boquist, introducing a lot of copies for each function call may seem strange (see middle of page 38), but allows the register allocator to have "maximal freedom" to choose the registers used to pass parameters. Boquist wants as few constraints as possible to prevent different functions and call sites from negatively interfering with each other. Boquist hopes that "coalesce" will remove most of the copy instructions. The ones that it leaves behind will actually be useful (see below).

Boquist states (see middle of page 38) that "coalesce" examines each copy instruction, checking whether or not the operands conflict with each other. If they do not, coalesce will combine with the two live ranges and delete the copy instruction. The two nodes in the interference graph will be merged into one, taking the union of all neighbors. For copy a1→r1, above, this would mean computing the argument into the correct register (targeting). For copy r1→t1 above, it would mean that f will use its argument in the register where the caller put it. The order for coalesces may be important, and for best results, "high priority" coalesces should be made before others.

Boquist further states (see bottom of page 38) that in the few cases where "coalesce" fails to delete a copy instruction, it does so because the two live ranges are in conflict. This probably indicates that the "register pressure" is so high that the copy instruction actually does something useful, i.e. turning a long-lived (hard to color) live range into two shorter live ranges. The shorter live ranges will hopefully have fewer neighbors in the interference graph and will be easier to color. This may be hard to imagine, but after "coalesce" has worked on the code for a while, values in the program that at first may not seem even remotely related, can have turned into the same live range.

See also U.S. Pat. No. 5,555,417 granted to Odnert et al. on Sep. 10, 1996 and entitled "Method and Apparatus For Compiling Computer Programs With Interprocedural Register Allocation" that is incorporated by reference herein in its entirety.

Improvements to prior art methods of interprocedural register allocation are desirable.

SUMMARY

In accordance with the invention, every function that is called (hereinafter "called function") is expanded by insertion of statements at the entry and exit thereof. Moreover, if the called function either has arguments or returns a value, then the function that does the calling (hereinafter "calling function") is also expanded. Under such circumstances, the calling function is expanded by insertion of statements prior to and subsequent to a statement in which a called function is invoked.

Many of the statements that are inserted in several embodiments of the invention contain new variables (called "synthetic variables") to which registers are allocated in the normal manner, i.e. during register allocation. However, the synthetic variables are not part of the originally-written software, but are introduced during the above-described expansion, to transfer arguments to and (if necessary) to return a value from a called function.

Statements that are inserted in accordance with the invention can be either statements that are translated into assembly code in the normal manner, or alternatively dummy statements which are never translated into assembly code (i.e. the compiler ignores such statements). Use of dummy statements ensures that webs are appropriately established for the synthetic variables. For example, in such a dummy statement either a definition is made or a use is made of a synthetic variable, to ensure creation of a web for the synthetic variable.

Moreover, after register allocation in a called function, one or more registers that are currently allocated in the called function are pre-allocated to appropriate variables in the calling function. Thereafter, register allocation in the calling function is performed, taking into account the pre-allocated registers.

Furthermore, in architectures that do not have a stack, a statement in which a called function is invoked is replaced by a jump statement, to transfer control to the beginning of the called function, for example as identified by a label. The label is inserted in the called function, just before the first executable statement in the called function.

DETAILED DESCRIPTION

Figure 1:
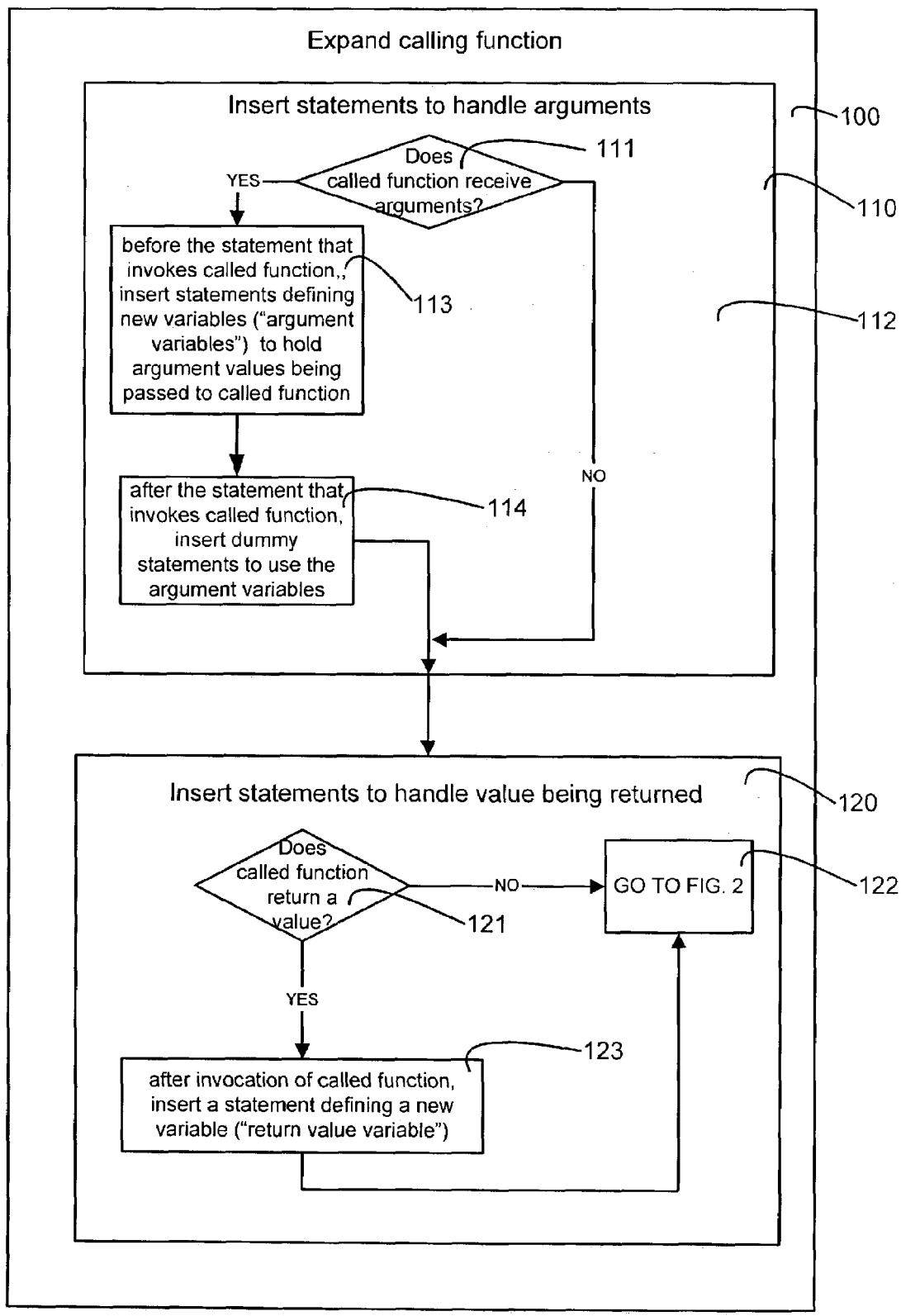
FIG. 1 illustrates, in a flow chart, acts performed to expand a calling function in accordance with the invention.

In several embodiments of the invention, a computer is programmed with a compiler to expand a number of functions prior to register allocation so as to eliminate the need for a stack. Every function that is called (hereinafter "called function") is expanded by insertion of statements that are either dummy statements or contain synthetic variables or both. Specifically, a computer that has been programmed with a compiler of the type described herein expands a calling function (as per act 100 in FIG. 1) by insertion of several statements-prior to and/or subsequent to invocation of a function being called in the calling function (as per acts 110 and 120 in FIG. 1).

In several embodiments, the compiler includes a parser which adds a statement (which temporarily acts as a place holder and which is later substituted) at the end of each function that is called, right after the last executable statement (normally a return statement). The parser also adds two labels in each called function, a first label at the beginning of the function and a second label to identify the just-added place-holder statement. The labels have a predetermined format, e.g. the first label is obtained by concatenating "_start" at the end of the function name, and the second label is obtained by concatenating "_end".

The first label is used by the compiler to transfer control from a calling function to the called function via a jump statement in the calling function. The second label is used by the compiler to transfer control from a return statement anywhere in the called function to the end of the called function. As will be apparent to the skilled artisan, instead of a jump statement, another statement may be used (e.g. to change the program counter), to transfer control.

In some embodiments of the invention, in act 110 the computer (programmed with the compiler) inserts statements to handle one or more arguments and then the computer goes to act 120 (described below) to insert statements to handle a value being returned. Specifically, when implementing act 110, the computer checks in act 111 if the called function has arguments. In act 111, if the answer is no, then the computer goes to act 120. In act 11, if the answer is yes, the computer (programmed with the compiler) inserts one or more new statements before and after the statement that invokes the called function. Specifically, new statements that are inserted in act 113 define new variables, (called "argument variables") to hold the values of arguments being passed to the called function. At this time, the computer (programmed with the compiler) may also maintain a data structure to indicate a correspondence between the argument variables being introduced and the arguments of the called function. For an example of the data structure, see _io_assignment in file CALLINST.TXT which is a class member of class TurboFCallInstruction which holds a list of pointers to instructions where argument variables are defined (in the order in which the corresponding arguments are passed to the function).

Variables of the type introduced in act 113 are also referred to herein as "synthetic variables" because these variables were not used in the originally-written software. Thereafter, in act 114, the computer programmed with the compiler inserts, after the statement that invokes the called function, dummy statements that use the argument variables which were defined in act 113.

Note that the statements added in act 113 are real statements that are to be executed, although in some cases they may be eliminated in an optimization phase that occurs later. On the other hand, statements added in act 114 are not to be executed, and are called "dummy statements." The dummy statements introduced by a compiler in accordance with the invention are not visible to a programmer. The dummy statements have the form of normal statements but are ignored during generation of assembly language code.

The dummy statements are implemented in one embodiment by a data structure that contains a flag in addition to an assembly language instruction. In another embodiment, a special class (in object oriented Perl) is defined for dummy statements. The dummy statements are included in a function graph, so that a web for each synthetic variable is appropriately defined (during register allocation) across the statement that invokes the called function.

The term "web" of a variable is used herein as defined on page 486 in Chapter 16 of the book "Advanced Compiler Design and Implemetation" by Steven S. Muchnick, published by Morgan Kaufmann, Academic Press 1997. This chapter 16 is incorporated by reference herein in its entirety. As used herein, a DU chain connects a definition of the variable with all uses of the variable that are reachable from the definition, in a control flow graph. Also, as used herein a "web" means a maximal union (i.e. largest union) of DU chains, such that for each definition D and use U of a variable, either U is in a DU chain of D, or there exists a sequence of definitions and uses of this variable namely D0, U0, . . . , Di, Ui, Di+1, Ui+1, . . . , Dn, Un such that, D=D0 and U=Un and for each i, Ui is in the DU chains of both Di and Di+1.

In an example of two DU chains namely D1U1 and D2U1, these two chains share the same use U1, and if there are no other uses reachable from D1 or D2 and no other definitions from which U1 is reachable, then a set containing the three statements D1, U1 and D2 forms the maximal union of DU chains. Hence in this example, a web contains these three statements.

Depending on the embodiment, the above-described dummy statements may be objects of a special class in an object oriented language. In such dummy statements, if there is an assignment this assignment is ignored during code generation (as illustrated in the attached software, where the "dumminess" is indicated by a special class). Dummy statements may be used for the purpose of introducing (a) definition of a variable in which case any number (such as 0) can be assigned to this variable; or (b) usage of a variable in which case any register that does not participate in register allocation can be the destination of the assignment.

The following example illustrates the addition of dummy statements in a calling function to handle arguments being passed to a called function. Assume that the calling function is g and the called function is h, which are originally written as follows:

```
g( )
{
    int i, j, k;
    k = 5;
    . . .
    i = 3;
    j = h(i) + 7;
    MEM [j] = k;
}
int h (int arg0)
{
    int a;
    a = arg0+1;
    return (a*a);
}
```

A parser of one embodiment that is included in a compiler scans the above-listed program and replaces a statement containing the function call with two statements, one containing only the function call and the other containing only the use of the value returned by the function. Therefore, in the above example, after parsing of the originally-written program that is being compiled, the calling function g is changed as follows:

```
g( )
{
    int i, j, k;
    k = 5;
    . . .
    i = 3;
    h (i);
    j = ghR + 7;
    MEM [j] = k;
}
int h (int arg0)
{
    int a;
    h_start:
    a = arg0+1;
    Hr = (a*a);
    h_end:
    nop;          //place holder statement added to support last
                  label
}
```

Note that the parser has introduced two return value variables: one in the calling function and another in the called function, namely ghR in function g and Hr in function h. The parser generates variable names ghR and Hr based on the respective function names. Therefore, the parser substitutes the return statement with an assignment to the new variable (also called "return value variable") of the value being returned. Note that the parser also inserts a jump to a label (e.g. h_end) at the end of a called function, for each return statement that is not physically at the end of the called function.

Note also that the above code is merely a convenient representation of changes made by the parser, because the parser does not actually change any code and instead, merely changes an internal representation of the code (in the form of a function call graph). However, an illustration of the code is provided herein merely to explain an example of operation of certain embodiments of the invention.

Next, after act 110 illustrated in FIG. 1, the following statements represent the calling function g:

```
g( )
{
    int i, j, k;
    k = 5;
    ...
    i = 3;
    g#h#0 = i;      // definition of argument variable
    h(i);           // unchanged statement
    PC = g#h#0;     // use of argument variable - dummy assignment
    j = ghR + 7;    // unchanged statement
    MEM [j] = k;
}
```

Furthermore, during act 123 illustrated in FIG. 1, a statement is added to define a return value variable because function h returns a value (which is tested in act 121). Note that this is a real statement, and temporarily any number can be assigned to the return value variable, and this number is later replaced during register allocation by the register that is allocated to the return variable in the called function.

Therefore, in this example, function g appears as follows:

```
g( )
{
    int i, j, k;
    k = 5;
    ...
    i = 3;
    g#h#0 = i;      // definition of argument variable
    h(i);           // unchanged statement
    PC = g#h#0;     // use of argument variable - dummy assignment
    ghR = 0;        // definition of return value variable - real
                    // assignment
    j = ghR + 7;    // unchanged statement
    MEM [j] = k;
}
```

Figure 2:
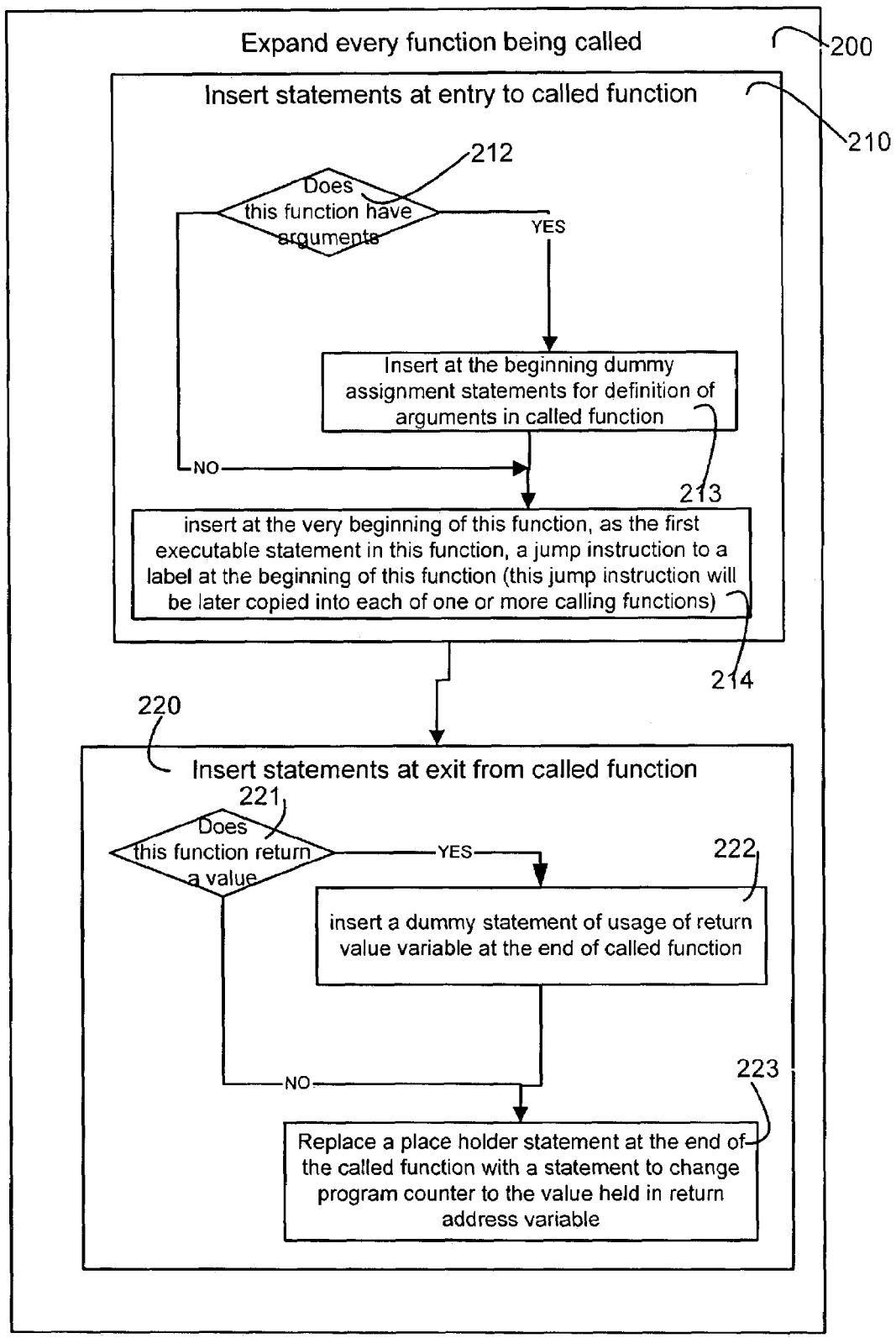
FIG. 2 illustrates, in a flow chart, acts performed to expand a called function in accordance with the invention.

After act 123, and also if the function does not return a value, act 122 goes to the beginning of expansion procedure for called function as illustrated in FIG. 2. Note that the acts in FIG. 2 are not performed in case of a "main" function because it is not called by any other function. In such a case control returns to the top of FIG. 1 if there is another function to be expanded.

Note that the argument variable g#h#0 has a very small web in the calling function (i.e. just across the jump instruction), although this variable has a web that goes across all statements in the called function (up to the last statement therein). In the above code, the program counter "PC" is used in the dummy statement because this register does not participate in register allocation. Note that instead of program counter, any other control register may be used in a dummy statement of the type described above, as will be apparent to the skilled artisan in view of this disclosure.

In addition, each called function in the originally-written program is also expanded in accordance with the invention, as noted briefly above and discussed below in detail in reference to act 200 in FIG. 2. Specifically, several statements are inserted at entry to the called function (as per act 210), and furthermore one or more statements are also inserted at exit from the called function (as per act 220). Note that exit from a called function can happen at any of numerous locations in the called function, as will be apparent to the skilled artisan.

During act 210, one or more of acts 212–213 (FIG. 2) may be performed, depending on the embodiment. In act 212, a check is made as to whether the called function has arguments. If so, then at the beginning of the called function, a number of dummy statements are inserted, to define the arguments. The just-described dummy statements are inserted to build a web for each argument within the called function. In the above example, the called function h is changed as follows after acts 211–213:

```
int h (int arg0)
{
    int a;          // unchanged
    h_start:        // label for jump statement
    arg0 = 0;       // dummy statement for building web for arg0
    a = arg0+1;     // unchanged
    Hr = (a*a);     // unchanged
    PC = Hr;        // dummy statement for building web for Hr
}
```

Note that the above-described dummy statements may be inserted regardless of before or after a first label (e.g. h_start) in the function of the type discussed above.

Next, act 214 is performed (either after act 213 or after act 212 depending on the decision made in act 212). Specifically in act 214, the a jump statement is temporarily inserted at the very beginning of this called function, to transfer control to label h_start. The jump instruction is inserted as the first executable statement in this called function. After register allocation, this jump instruction is copied into each of one or more calling functions, such as function g, to replace a statement containing an invocation of the called function. Note that the jump statement being copied uses a variable ("return address variable") to hold the return address in the calling function.

In the above example, the called function h is changed as follows after act 214:

```
int h (int arg0)
{
    int a;              // unchanged
    jsr h#0, h_start;   // jump statement inserted - to be later copied to
                        // one or more calling functions
    h_start:            // label for jump statement
    arg0 = 0;           // dummy statement for building web for arg0
    a = arg0+1;         // unchanged
    Hr = (a*a);         // unchanged
    h_end:              // label for end of called function
    nop;                // placeholder statement
}
```

In act 221, a check is made as to whether the called function returns a value, and if so act 222 is performed to insert a dummy statement of usage of return value variable Hr at the very end of called function (regardless of where one or more return statements were located in the originally-written program). In this dummy statement, as shown below, register TSTT is used because TSTT is a special purpose register which does not participate in register allocation. As noted above, any other register, such as a control register or program counter, may be used instead of register TSTT, and vice versa.

After act 222 (and also after act 221 if the decision was no), act 223 is performed to replace a place holder statement at the very end of the called function with a statement to change program counter PC to the value held in return address variable which was used in the jump statement inserted as per act 214.

```
int h (int arg0)
{
int a;              // unchanged
jsr h#0, h_start;   // jump statement inserted - to be later copied to
                    // one or more calling functions
h_start:            // label for jump statement
arg0 = 0;           // dummy statement for defining arg0 web
a = arg0+1;         // unchanged
Hr = (a*a);         //unchanged
h_end:
move PC, h#0;       //  statement for transferring control to calling
                    // function
TSTT = Hr;          // dummy statement for building web for Hr
}
```

As shown above, a dummy statement is inserted at the end of the called function to indicate use of the return value variable for the purpose of defining a web for this variable.

Thereafter, register allocation is performed, one function at a time, in a bottom-up traversal of a function call graph. After performing register allocation on a bottom-most function, one or more registers that are allocated in the bottom-most function may be pre-allocated to variables in the calling function (i.e. prior to register allocation), to the extent such pre-allocation is appropriate.

Therefore, a register that is allocated to hold return value in the called function is used in place of a value (e.g. 0) in the calling function that was assigned to the return value variable (in the calling function) by the statement introduced in act 123. For example, if a register TR0 is allocated to the variable Hr which holds the return value then the same register TR0 is used to replace the value (e.g. 0) being assigned to variable ghR that receives the return value Hr in the calling function.

Moreover, another register that is allocated to hold an argument in the called function is pre-allocated in the calling function. Register allocation in the calling function is thereafter performed in the normal manner, taking into account the just-described pre-allocated registers and their respective variables and all information about registers allocated in the called function (e.g. the set of webs used in the called function).

Figure 3:
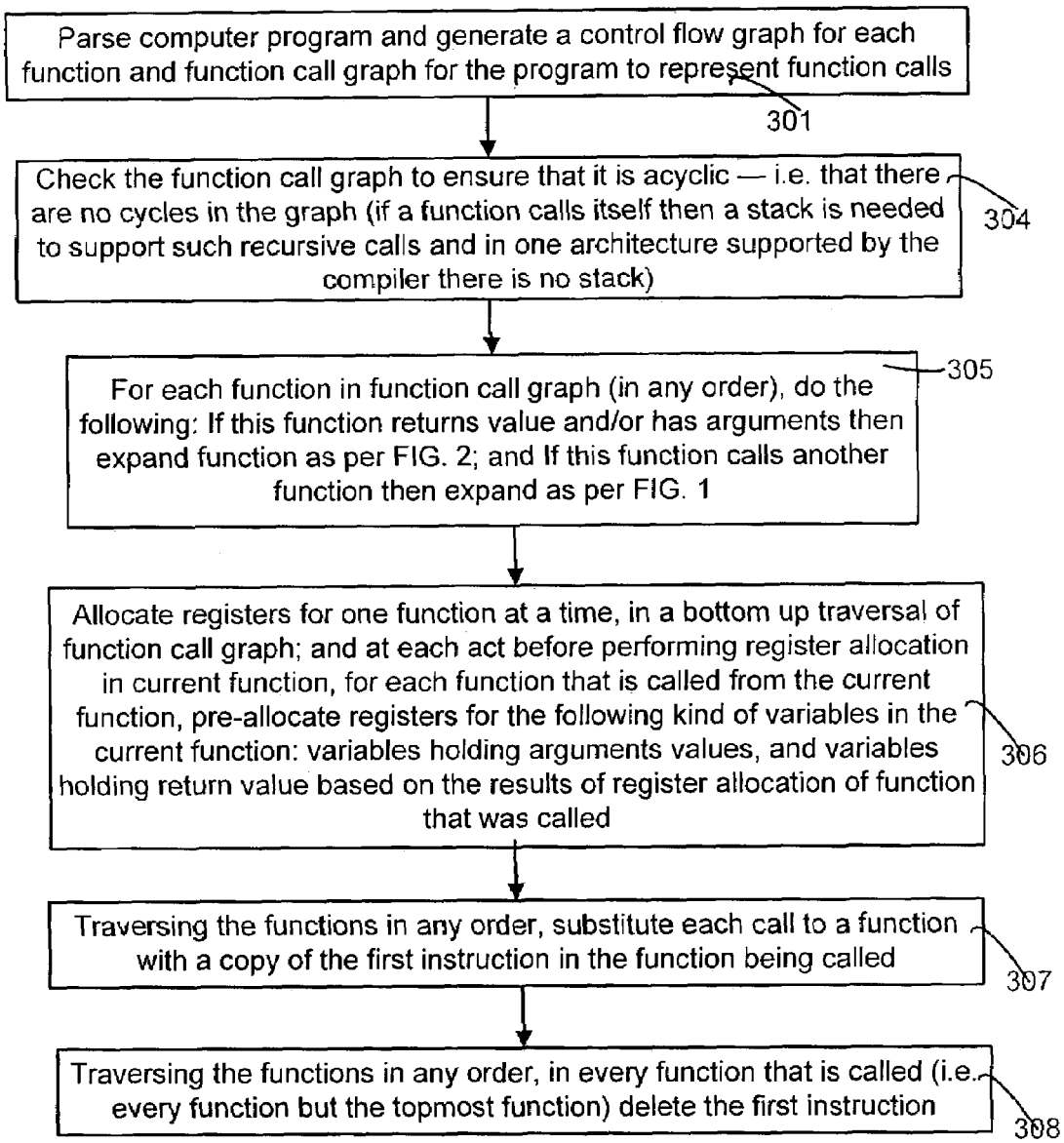
FIG. 3 illustrates, in a flow chart, acts performed to translate a software program from a high level language into assembly language, including function expansion and register allocation in accordance with the invention.

In some embodiments, a computer that is programmed in accordance with the invention performs acts 301 and 304–308 illustrated in FIG. 3. Specifically, in act 301, the computer scans in and parses a computer program, in the manner described herein and generates control flow graph, for each function, in the normal manner. In the control flow graph, nodes represent instructions and edges represent control flow (these are unidirectional edges). In act 301 the computer also generates function call graph for the program being compiled. In the function call graph, nodes represent functions and edges represent function calls (these are unidirectional edges). A function call graph is also called a procedure call graph.

Thereafter, in act 304, the computer checks the function call graph to ensure that the graph is acyclic —i.e. that there are no cycles in the graph. Specifically, if a function calls itself then the graph is no longer acyclic, and a stack would be needed to support recursive calls. However, in one architecture, there is no stack and for this reason the computer ensures that the graph is acyclic.

Note that act 304 may be performed in any manner well known in the art, e.g. a depth first search or breadth first search may be performed, to see if going from one node the computer is able to reach the same node again.

Thereafter, a computer programmed with a compiler in one embodiment of the invention orders nodes of the function call graph in such a way that all edges are directed in a common direction, e.g. all edges go from left to right if all nodes are arranged along a horizontal line ("topological" ordering of the nodes). Note that any method well known in the art can be used to perform topological ordering. The topologically ordered list is used in act 306 (described below).

Next, in act 305 the computer expands every called function and every calling function. Act 305 is performed in the manner described above in reference to FIGS. 1 and 2.

Next, the computer performs register allocation (in act 306) one function at a time, in a bottom up traversal of the function call graph. Note that before performing register allocation in each calling function, the programmed computer pre-allocates one or more registers that are currently allocated to hold return values of called functions, and also pre-allocate one or more registers currently allocated to hold arguments of called functions.

After completion of register allocation, act 307 is performed by traversing the functions in any order, to substitute each call to a function with a copy of the first instruction (which is a jump instruction) in the function being called. Next, act 308 traverses the functions in any order, in every function that is called (i.e. every function but the topmost function), and deletes the first instruction.

Figure 4:
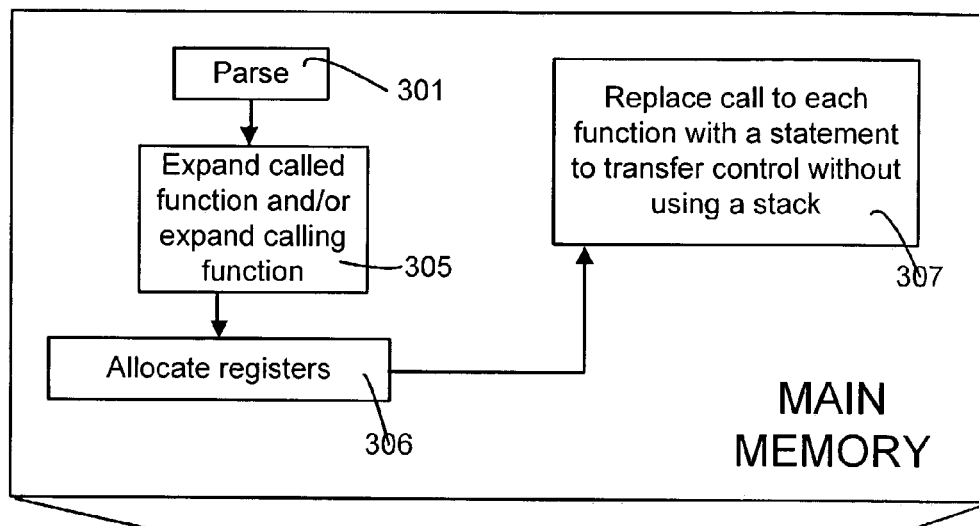
FIG. 4 illustrates, in a block diagram, a computer that is programmed in accordance with the invention, to perform one or more acts of the type illustrated in FIG. 3.
Figure 4:
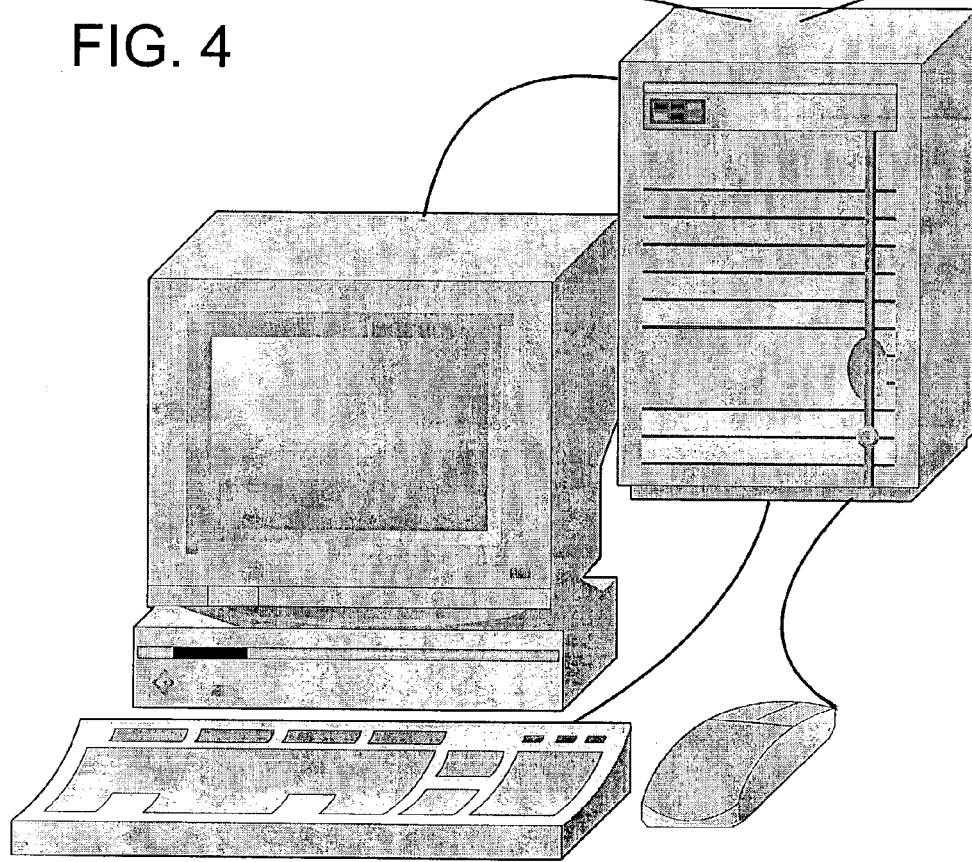

FIG. 4 illustrates, in a block diagram, a computer that is programmed in accordance with the invention, to perform one or more acts of the type illustrated in FIG. 3.

Numerous modifications, variations and adaptations of the examples, embodiments, and implementations described herein will be apparent to the skilled artisan in view of the disclosure.

For example, dummy assignments can be made in statements that are marked in some other manner as being not executable. Moreover, recursive calls to the same function are not permitted in some embodiments, so as to enable transfer of information across all function calls to performed without use of a stack. However, in some embodiments recursive calls may be permitted, as long as a stack is present in the computer that executes the software program.

Although certain acts are shown in FIGS. 1–4 as being performed after other acts, it is also possible to perform the acts in a different order, as would be apparent to the skilled artisan in view of the disclosure.

Therefore, numerous modifications, variations and adaptations of the examples, embodiments, and implementations described herein are encompassed by the attached claims.

The invention claimed is:

1. A computer-implemented method for expanding a software program by insertion of statements, the method comprising:

inserting at entry of a function ("called function") a label;

inserting at entry of the called function a first statement to define at least a new variable ("argument variable"), if the called function receives at least an argument;

automatically replacing each return statement in the called function with at least a statement that assigns to another new variable ("return value variable") a value to be returned to a calling function, if the called function returns a value; and inserting at the end of the called function, a second statement to use the return value variable, provided the called function returns a value;

wherein said software program comprises said called function and said calling function.

2. The method of claim 1 further comprising:

substituting, in the calling function, each statement that contains a call to the called function, with a jump instruction to the label inserted at entry of called function.

3. The method of claim 1 further comprising:

inserting a place holder statement at end of called function, after the last executable statement in the called function;

replacing, in called function, each return statement that is not at end of the called function, with at least a jump to the place holder statement; and replacing the place holder statement with at least a statement to transfer control to the calling function.

4. The method of claim 1 further comprising, if the called function has an argument:

inserting at least one statement to define a variable ("argument variable") to hold an argument value being passed to a called function; and inserting after a statement that invokes the called function, yet another statement to use the argument variable.

5. The method of claim 1 further comprising, if the called function returns a value:

inserting after a statement that invokes the called function, yet another statement to define a variable that holds the value being returned.

6. The method of claim 1 wherein:

each of said first statement and said second statement is a dummy statement that is not to be executed.

7. The method of claim 1 further comprising, after said inserting of second statement:

allocating registers to a plurality of variables in the software program;

wherein said plurality of variables comprises said argument variable and return value variable.

8. A computer programmed to expand a software program by insertion of statements, the computer comprising:

means for inserting at entry of a function ("called function") a label;

means for inserting at entry of the called function a dummy statement to define at least a new variable ("argument variable"), if the called function receives at least an argument;

means for replacing each return statement in the called function with a statement that assigns to another new variable ("return value variable") a value to be returned to a calling function, if the called function returns a value; and means for inserting at the end of the called function, another dummy statement to use the return value variable, provided the called function returns a value;

wherein said software program comprises said called function and said calling function.

9. The computer of claim 8 further comprising:

means for substituting, in the calling function, each statement that contains a call to the called function, with a jump instruction to the label inserted at entry of called function.

10. The computer of claim 8 further comprising:

means for inserting a place holder statement at end of called function, after the last executable statement in the called function;

means for replacing, in called function, each return statement that is not at end of the called function, with a jump to the place holder statement; and means for replacing the place holder statement with a statement to transfer control to the calling function.

11. The computer of claim 8 further comprising:

means for checking if the called function has an argument;

means for inserting at least one statement to define a variable ("argument variable") to hold an argument value being passed to a called function; and means for inserting after a statement that invokes the called function, yet another dummy statement to use the argument variable.

12. The computer of claim 8 further comprising:

means for checking if the called function returns a value; and means for inserting after a statement that invokes the called function, yet another dummy statement to define a variable that holds the value being returned.

13. The computer of claim 8 further comprising:

means for allocating registers to a plurality of variables in the software program;

wherein said plurality of variables comprises said argument variable and return value variable.

14. The computer of claim 8 wherein:

said statement is a dummy statement that is never translated into assembly code.

* * * * *